UNITED STATES PATENT OFFICE.

ARVID NILSON, OF CHICAGO, ILLINOIS, ASSIGNOR TO WAHL-HENIUS INSTITUTE OF FERMENTOLOGY, OF CHICAGO, ILLINOIS, A CORPORATION OF ILLINOIS.

HOP-EXTRACTION PROCESS.

978,476.  Specification of Letters Patent.  Patented Dec. 13, 1910.

No Drawing.  Application filed August 25, 1910.  Serial No. 578,837.

*To all whom it may concern:*

Be it known that I, ARVID NILSON, a subject of the King of Sweden, residing at Chicago, in the county of Cook and State of Illinois, have invented a new and useful Improvement in Hop-Extraction Processes, of which the following is a specification.

In the uses to which hops are put, such as hopping fermented malt beverages, the most important and valuable constituents of the hops are their contained bitter substances and resins, inasmuch as they not only impart to the beverage the desired agreeable bitter taste but, because of certain well-known preservative qualities these constituents possess, they also enhance the stability of the beverage.

The object of my invention is to provide a process of extracting these constituents from the hops which shall produce the extract in a peculiarly desirable condition for the uses referred to; and this I accomplish by the novel procedure hereinafter described and claimed.

As is known in the art, the aforesaid constituents of hops are, to a large extent, insoluble in water, while they readily dissolve in such solvents as ether, petroleum ether and alcohol, as also in watery solutions of caustic alkalies and alkaline carbonates; and in the employment of either of these forms of alkali to produce a solution of the said constituents of hops, their practically complete precipitation is effected by acidifying the solution. However, the use for the purpose of any of the solvents referred to is attended with disadvantages. Thus, in the use, for example, of the fixed alkalies, as sodium hydroxid or sodium carbonate for the solution, they dissolve out of the hops not only their contained bitter substances and resins, but also considerable quantities of objectionable albumen, part of which is unavoidably precipitated with these hop-constituents by acidifying the solution, whereby the precipitate is rendered impure and, besides, bulky and difficult of separation from the liquid. I overcome these objections by using as the solvent dilute ammonium hydroxid which, as I have discovered, readily dissolves the bitter substances and resins out of the hops without bringing therefrom any material quantity of undesirable albumen into solution, so that when this ammoniacal solution is acidified, the precipitate consists almost solely of these constituents of the hops with only a small percentage of albumen. The precipitate is therefore practically pure, settles rapidly and is readily separable from the liquid by sedimentation, filtration or "centrifuging", the latter being a modern term employed in the art to signify separation by centrifugal action.

To practice my improvement I proceed as follows: With about 250 gallons of water containing about 0.09 per cent. of ammonia ($NH_3$) I mix about 100 pounds of hops. The ammoniacal water for the mixture may be prepared by adding about 1¼ gallons of ordinary aqua ammonia of 0.9 specific gravity to about 248¾ gallons of pure water. This mixture is maintained at a temperature of about 100° F. for about two hours, though if the temperature be lower or higher, as it may be, the period is to be prolonged or shortened accordingly. The liquid is then run off from the hops, preferably by straining through the latter, as an ammoniacal filtrate containing nearly the whole amount of the bitter substances and resins originally in the hops; and it should be mentioned, by way of suggestion, that any remnant of these constituents in the spent hops may be saved by subjecting the latter to the same treatment as that described and using the liquid run off therefrom with the next batch of fresh hops treated. To the ammoniacal filtrate first obtained, I add a suitable acid, preferably lactic acid, in quantity sufficient to acidify the liquid and precipitate therein the bitter substances and resins thus extracted from the hops. The precipitate is then allowed to settle, which it does rapidly, when the clear liquid is run off and the precipitated product is filtered or "centrifuged" to separate more of the solution from it, and stored in hermetically sealed cans, or the like, for use.

Among the advantages obtained as the result of my improved process, the following may be stated as being of particular importance: A saving in hops is effected, since, as I have found, the constituents extracted from one pound of the hops, when used for hopping wort, impart thereto the same degree of bitter taste as is imparted to wort by two pounds of the same hops used in the ordinary manner; and wort boiled with the extract of my process has a more agreeable and slightly milder hop-taste than when boiled, as usual, with whole hops. Furthermore, the hops to be treated by my process may be fresh from the field, without any need of carefully picking them over, and that condition avoids any necessity of drying, curing, packing, transporting or storing them, all of which handling tends to deteriorate the hops and reduce their normally-contained quantity of valuable soft resin. The fact may properly be referred to in this connection that the extract resulting from the practice of my invention is practically devoid of the aromatic properties of the hops, since their contained essential oil is insoluble in water as also in the ammoniacal water employed. However, it is quite possible, after extracting the bitter substances and resins, to extract the essential oil from the hop-residue by subjecting the latter to the action of steam for a brief period, say about twenty minutes, and recovering from the condensed steam the oil by skimming, since it forms an oily layer on the surface of the water; and the essential oil thus obtained may be used for any purpose in connection with which hops are commonly used, as in the manufacture of beer, wherein it may be added, in proper quantity, to the fermenting wort in the cellar. Thus, none of the valuable constituents of the hops need be lost or wasted by reason of the use of my improved process.

What I claim as new and desire to secure by Letters Patent is—

1. The process of extracting from hops their contained bitter substances and resins, which consists in subjecting the hops to the dissolving action of dilute ammonium hydroxid, thereupon separating the resultant solution from the hops, acidifying said solution to precipitate said constituents, and separating the precipitate from the liquid.

2. The process of extracting from hops their contained bitter substances and resins, which consists in preparing a dilute solution of ammonium hydroxid, mixing hops with said solution in the proportion of about 100 pounds of the hops to about 250 gallons of the solution, and maintaining the hops under subjection to the action of the solution until it has extracted said constituents of the hops, thereupon separating the resultant liquid from the hops, then acidifying said liquid by adding lactic acid thereto to precipitate said constituents, and separating and saving the resultant precipitate from the liquid.

ARVID NILSON.

In presence of—
A. U. THORIEN,
R. A. SCHAEFER.